(12) United States Patent
Kim (10) Patent No.: US 7,027,126 B2
(45) Date of Patent: Apr. 11, 2006

(54) OPTICAL SCANNING APPARATUS

(75) Inventor: Hyung-soo Kim, Cycongi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 10/766,905

(22) Filed: Jan. 30, 2004

(65) Prior Publication Data

US 2004/0189961 A1 Sep. 30, 2004

(30) Foreign Application Priority Data

Mar. 26, 2003 (KR) .................... 10-2003-0018772

(51) Int. Cl.
*G03B 27/48* (2006.01)
*G03B 27/52* (2006.01)

(52) U.S. Cl. ........................ 355/49; 355/40
(58) Field of Classification Search ................ 355/18, 355/27, 40, 47, 49; 382/140, 321
See application file for complete search history.

(56) References Cited

U.S. PATENT DOCUMENTS

| | | | | |
|---|---|---|---|---|
| 4,682,842 A | * | 7/1987 | Brueggemann | 359/216 |
| 5,274,502 A | * | 12/1993 | Demerritt et al. | 359/642 |
| 5,710,654 A | * | 1/1998 | Ota | 359/205 |
| 5,889,606 A | * | 3/1999 | Toyoda | 359/215 |
| 5,966,161 A | * | 10/1999 | Kato | 347/258 |
| 6,222,663 B1 | * | 4/2001 | Plotkin et al. | 359/216 |
| 6,643,044 B1 | * | 11/2003 | Iizuka | 359/207 |

FOREIGN PATENT DOCUMENTS

JP 2002-333590 11/2002

OTHER PUBLICATIONS

A. Arimoto, et al., "Laser scanning system using a rotationally asymmetric aspheric surface", Feb. 20, 1991, Applied Optics, vol. 30 No. 6, pp. 699-704.*

* cited by examiner

*Primary Examiner*—Michael Tokar
*Assistant Examiner*—Vivian Nelson
(74) *Attorney, Agent, or Firm*—Staas & Halsey LLP

(57) ABSTRACT

An optical scanning apparatus that includes a light source, a polygon mirror for deflecting a plurality of light beams emitted from the light source, and an image focusing system for causing the light beams deflected by the polygon mirror to form spots on surfaces of a plurality of photosensitive drums, wherein the image focusing system is disposed between the polygon mirror and the photosensitive drums, and includes scanning lenses for causing the beams deflected by the polygon mirror to form spots on the respective surfaces of the photosensitive drums, and the central axes of the scanning lenses are spaced a predetermined distance from optical axes extended from the center of the light source.

15 Claims, 6 Drawing Sheets

OPTICAL SCANNING APPARATUS

CROSS-REFERENCE TO RELATED APPLICATIONS

This application claims the priority of Korean Patent Application No. 2003-18772, filed Mar. 26, 2003, in the Korean Intellectual Property Office, the disclosure of which is incorporated herein in its entirety by reference.

BACKGROUND OF THE INVENTION

1. Field of the Invention

The present invention relates to an optical scanning apparatus used in a printer, and more particularly, to an optical scanning apparatus capable of improving bowing of scan lines on a surface to be scanned which occurs when a beam of light emitted from a light source is obliquely incident on a polygon mirror in a sub-scanning direction. In addition, the present invention relates to an optical scanning apparatus which can be used as a tandem optical scanning apparatus in which a plurality of beams of light are simultaneously focused on a plurality of organic photoconductors.

2. Description of the Related Art

In general, an optical scanning apparatus such as a laser scanning unit is applied to an image forming apparatus for printing an image on a sheet of paper such as found in a copier, printer, facsimile, or the like. An optical scanning apparatus is used to scan a beam of light emitted from a light source such as a laser diode on a photosensitive medium of the image forming apparatus to form an electrostatic latent image on the photosensitive medium.

Figure 1A:
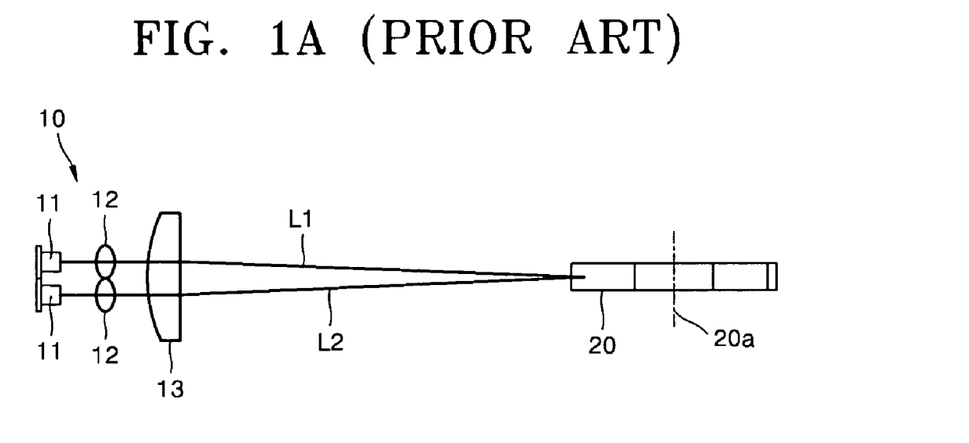
FIGS. 1A and 1B are diagrams describing a sub-scanning direction of a conventional optical scanning system, and show a light source portion and an image producing portion, respectively.
Figure 1B:
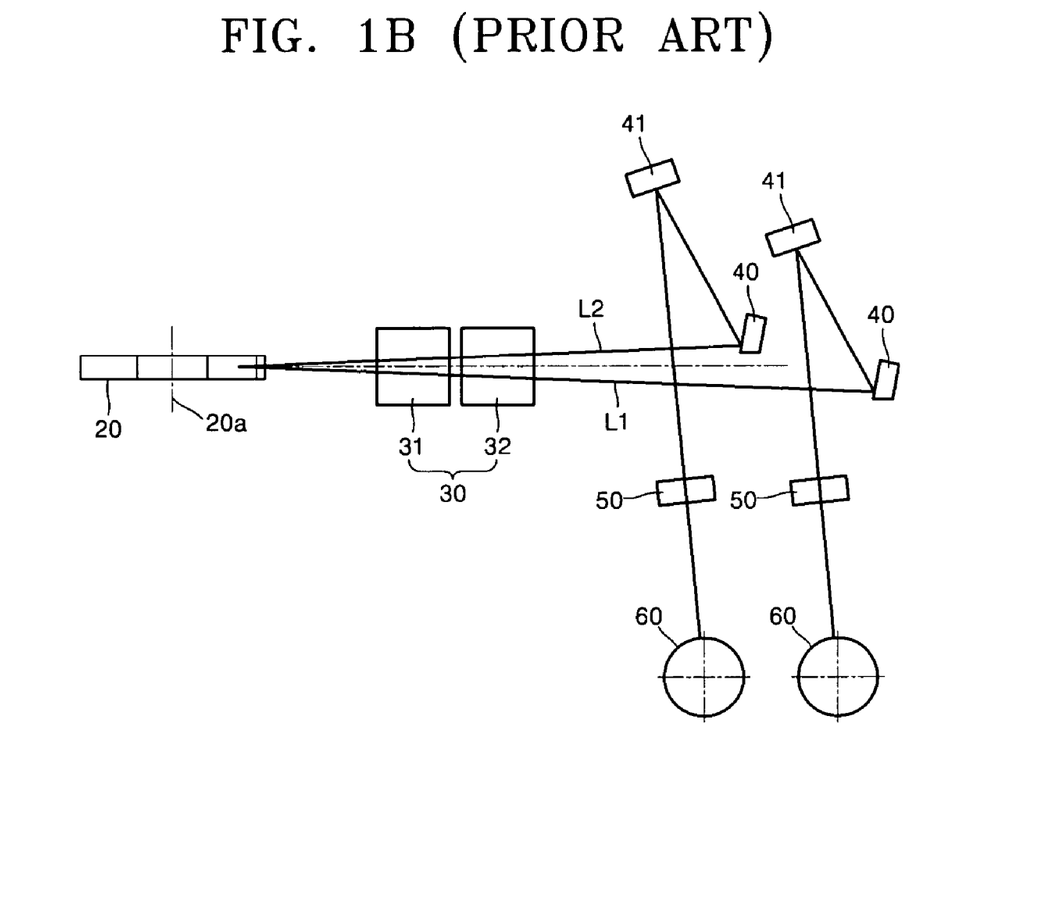

FIGS. 1A and 1B are diagrams illustrating a sub-scanning direction of a scanning optical system disclosed in Japanese Laid-Open Patent Application No. 2002-333590, and show a light source portion and an image producing portion, respectively. In addition, FIG. 2 is a diagram describing a main scanning direction of the scanning optical system shown in FIGS. 1A and 1B.

Figure 2:
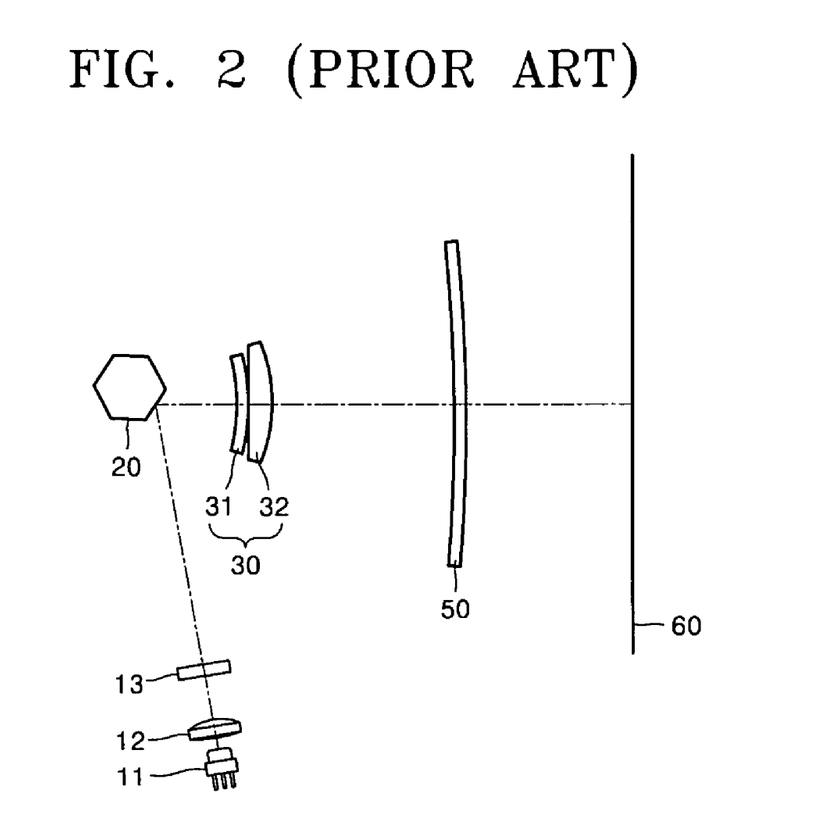
FIG. 2 is a diagram describing a main scanning direction of the optical scanning system shown in FIGS. 1A and 1B.

Referring to FIGS. 1A, 1B, and 2, the scanning optical system has a light source portion 10 generating a laser beam or a plurality of laser beams, a cylindrical lens 13 for converging the beams emitted from the light source portion 10, a polygon mirror 20 as a deflector for reflecting and deflecting the laser beams converged by the cylindrical lens 13, and an image focusing system causing the light beams reflected by the polygon mirror 20 to form spots on surfaces to be scanned.

The light source portion 10 of the scanning optical system has two semiconductor lasers 11 which are light sources, and two collimating lenses 12 for converting beams emitted from the semiconductor lasers 11 into parallel beams. The cylindrical lens 13 serves as an anamorphic optical element for converging two beams L1 and L2 made parallel beams by the collimating lenses 12 in a sub-scanning direction.

The image focusing system has a scanning lens 30 consisting of a first lens 31 disposed on the polygon mirror 20 side and a second lens 32 disposed on the surface to be scanned side, and a correction lens 50 disposed to be closer to the surface to be scanned than the scanning lens 30 for correcting bowing of the scan lines Here, at least one convex surface included in the scanning lens 30 is a toric surface having a strong refractive power in the sub-scanning direction, and one surface of the correction lens 50 is an anamorphic aspherical surface which is set so that the radius of curvature of the correction lens 50 in the sub-scanning direction can have nothing to do with the shape of a section of the correction lens 50 in the main scanning direction at a position away from the optical axis, and satisfies a formula $-1.1 < R_{z2}/R_{z1} < -0.3$. Here, $R_{z1}$ is a radius of curvature of the toric surface in the sub-scanning direction, and $R_{z2}$ is a radius of curvature of the anamorphic aspherical surface in the sub-scanning direction.

In the above configuration, the two beams L1 and L2 emitted from the light source portion 10 are simultaneously deflected by the polygon mirror 20 which rotates about a rotation axis 20a. The two deflected beams L1 and L2 travel at a predetermined angle with the sub-scanning direction, and enter the scanning lens 30 consisting of the first lens 31 and the second lens 32. Thereafter, the beams exiting the scanning lens 30 are reflected by two pairs of mirrors 40 and 41, respectively, and are converged onto two photosensitive drums 60 to form beam spots thereon. The semiconductor lasers (light sources) 11 are on/off controlled and a predetermined electrostatic latent image is formed on the photosensitive drums 60.

With the above-described optical scanning system, it is possible to correct bowing of scan lines that occurs due to an aberration in the sub-scanning direction without changing the power distribution in the main scanning direction. In addition, in the tandem optical scanning apparatus used in a color laser printer or the like, the deflector can be used in common by simultaneously deflecting a plurality of beams with the single polygon mirror. Accordingly, the number of parts can be reduced, and the size of an apparatus can be smaller. In addition, since it is possible to make the polygon mirror thinner when the plurality of beams are caused to be incident on the polygon mirror obliquely with respect to the sub-scanning direction so that incident positions of the beams at the polygon mirror can be nearly the same, the manufacturing cost of the polygon mirror can be reduced.

However, when the laser beams are incident on the polygon mirror obliquely in the sub-scanning direction, scan lines, which are the traces of beam spots, are curved on the surface to be scanned. Such curving in scan lines is called bowing, and the bowing causes printing precision to be low, and deteriorates the quality of a printed image. Also, the bowing deteriorates reproduction of colors in a color laser printer having a tandem optical scanning apparatus.

In order to restrain the above bowing, a method of making the image producing optical system using two scanning lenses and one correcting lens has been used in the conventional scanning optical system described above. However, this method causes the number of parts to increase, and causes the cost of manufacture and assembly to increase, and, therefore, the benefit of using the polygon mirror in common is canceled out. In addition, the correction lens must be made as a plastic injection molded lens since the correction lens has the anamorphic aspherical surface having a lengthwise magnitude much greater than a thickness-wise magnitude, and it is difficult to achieve the required preciseness in the shape of the correction in manufacturing the plastic injection molded lens having such a shape.

SUMMARY OF THE INVENTION

To solve the above and/or other problems, it is an aspect of the present invention to provide an optical scanning apparatus capable of improving, by decentering a scanning lens without using a correction lens, bowing of scan lines on a surface to be scanned that occurs when a beam of light emitted from a light source is obliquely incident on a polygon mirror in a sub-scanning direction, and, therefore, to achieve compactness and lightness of the optical scanning apparatus and to reduce a manufacturing cost thereof.

Additional aspects and/or advantages of the invention will be set forth in part in the description which follows and, in part, will be obvious from the description, or may be learned by practice of the invention.

Accordingly, to achieve the above and/or other aspects, there is provided an optical scanning apparatus including a light source, a polygon mirror for deflecting a plurality of light beams emitted from the light source, and an image focusing system for causing the light beams deflected by the polygon mirror to form spots on surfaces of a plurality of photosensitive drums, wherein the image focusing system is disposed between the polygon mirror and the photosensitive drums, and includes scanning lenses for causing the beams deflected by the polygon mirror to form spots on the respective surfaces of the photosensitive drums, and the central axes of the scanning lenses are spaced a predetermined distance from optical axes extended from the center of the light source.

In an aspect of the invention the optical scanning apparatus satisfies $0.2 \leq C1/A1 \leq 3.5$ and $0.2 \leq B1/A1 \leq 3.5$ where A1 is a distance spaced between the optical axis and the beam point on the polygon mirror, B1 is a distance spaced between the optical axes and the respective central axes of the scanning lenses, and C1 is a distance spaced between the optical axes and the beam points on the photosensitive drums.

The plurality of light beams emitted from the light source are obliquely incident on the polygon mirror at a predetermined angle in a sub-scanning direction. The plurality of light beams emitted from the light source are incident on one polygon mirror.

In another aspect, the optical scanning apparatus includes a collimating lens collimating or converging beams emitted from the light source, and a cylindrical lens converging the beams having passed through the collimating lens in a sub-scanning direction and causing the beams to be incident on the polygon mirror. The plurality of beams emitted from the light source are incident on the polygon mirror through one collimating lens and one cylindrical lens.

In another aspect, the optical scanning apparatus includes reflecting mirrors installed between the polygon mirror and the scanning lenses changing a distance or distances between the plurality of beams deflected by the polygon mirror. The scanning lens is an asymmetrical aspherical plastic lens.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
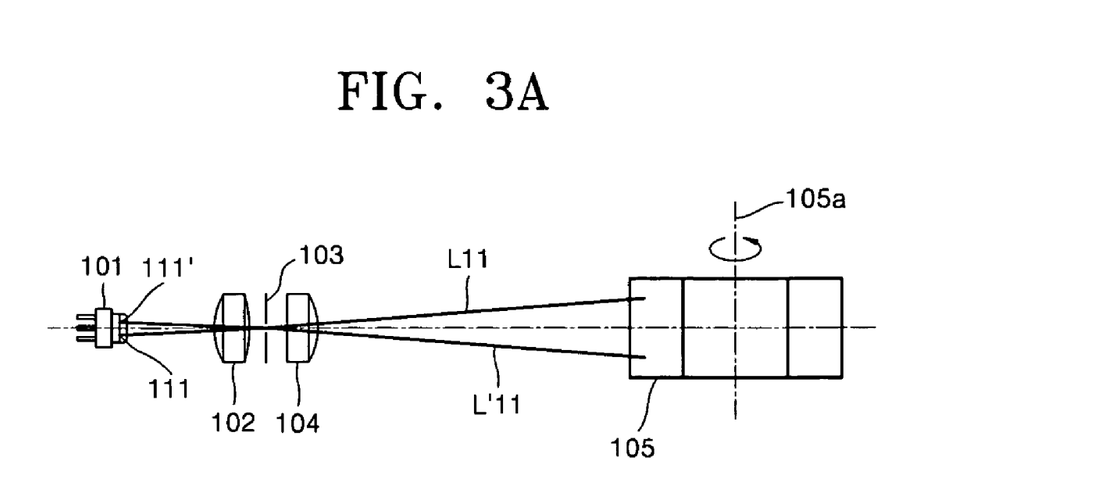
FIGS. 3A and 3B are schematic diagrams illustrating a sub-scanning direction of an optical scanning apparatus according to an embodiment of the present invention, and show a light source portion and an image producing portion, respectively.
Figure 3B:
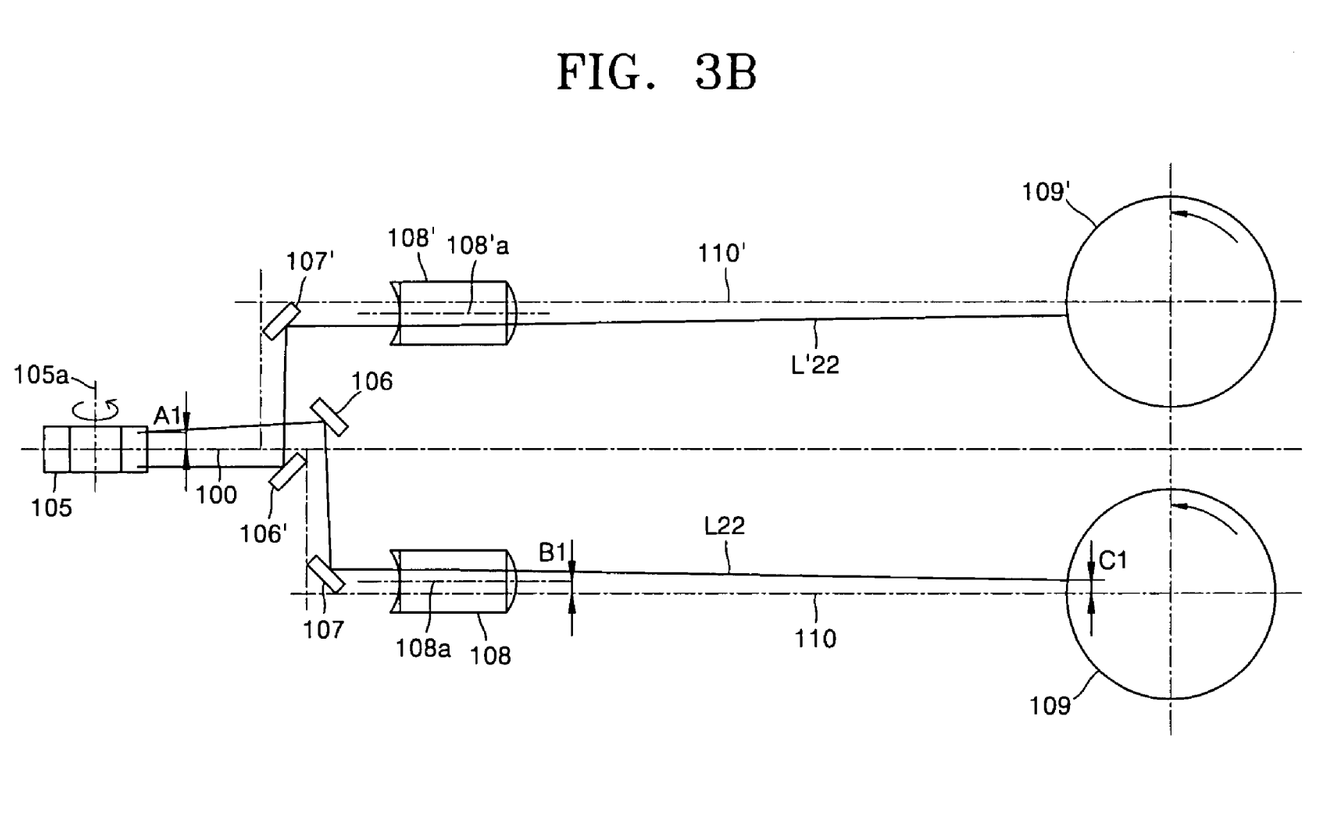

FIGS. 3A and 3B are schematic diagrams illustrating a sub-scanning direction of an optical scanning apparatus according to an embodiment of the present invention. FIG. 3A shows a light source portion including an optical path from a light source to a polygon mirror, and FIG. 3B shows an image producing portion including an optical path from the polygon mirror to a photosensitive drum.

Referring to FIGS. 3A and 3B, an optical scanning apparatus includes a light source 101, a polygon mirror 105 reflecting and deflecting a plurality of beams emitted from the light source 101, and an image focusing system causing the light beams deflected by the polygon mirror 105 to form spots on surfaces of a plurality of photosensitive drums 109 and 109'.

A laser semiconductor that emits a single beam or a plurality of beams is used as the light source 101, and reference numerals 111 and 111' denote two laser beams. It is to be understood that two laser beams are shown for ease of illustration and the present invention does not require two laser beams in all embodiments.

The polygon mirror 105 reflects and deflects laser beams emitted from the light source 101 while being rotated by a motor (not shown) about a rotation axis 105a clockwise or counterclockwise. The polygon mirror 105 is provided with a plurality of deflecting surfaces, and the beams emitted from the light source 101 are obliquely incident on the deflecting surfaces in a sub-scanning direction while making a predetermined angle with the respective deflecting surfaces.

In addition, a collimating lens 102 and a cylindrical lens 104 are disposed between the light source 101 and the polygon mirror 105. The collimating lens 102 is for collimating or converging beams emitted from the light source 101, and the cylindrical lens 104 is for converging the beams having passed through the collimating lens 102 in a sub-scanning direction and causing the beams to be incident on the polygon mirror 105. Reference numeral 103 in FIG. 3A denotes an aperture iris, and reference numerals L11 and L'11 denote optical paths along which two beams emitted from the light source 101 travel toward the polygon mirror 105, respectively.

As shown in FIGS. 3A and 3B, two beams emitted from the light source 101 pass through one collimating lens 102 and one cylindrical lens 104 and are incident on one polygon mirror 105.

An image producing optical system includes scanning lenses 108 and 108' or f-theta lenses which are disposed between the polygon mirror 105 and the photosensitive drum 109 and 109' so that the beams deflected by the polygon mirror 105 can form spots on the photosensitive drum 109 and 109' and can produce images. Here, the scanning lenses 108 and 108' are asymmetrical aspherical plastic lenses, though other types of aspherical lenses may be used.

First reflecting mirrors 106 and 106' and second reflecting mirrors 107 and 107' are disposed between the polygon mirror 105 and the scanning lenses 108 and 108' so that the distance between the two beams deflected by the polygon mirror 105 can be changed. Here, differing from FIG. 3B, it is understood that the number and the positional angles of the reflecting mirrors 106, 106', 107, and 107' can be altered according to predetermined purposes.

In addition, scanning lenses 108 and 108' are disposed to offcenter, or offset, with respect to the respective optical axes 110 and 110'. That is, the central axes 108a and 108'a of the scanning lenses 108 and 108' are spaced a predetermined distance from the optical axes 110 and 110' changed by the first reflecting mirrors 106 and 106' and the second reflecting mirrors 107 and 107'. In FIG. 3B, reference numerals L22 and L'22 denote optical paths along which the beams having passed the scanning lenses 108 and 108' travel toward the photosensitive drum 109 and 109'.

Figure 4:
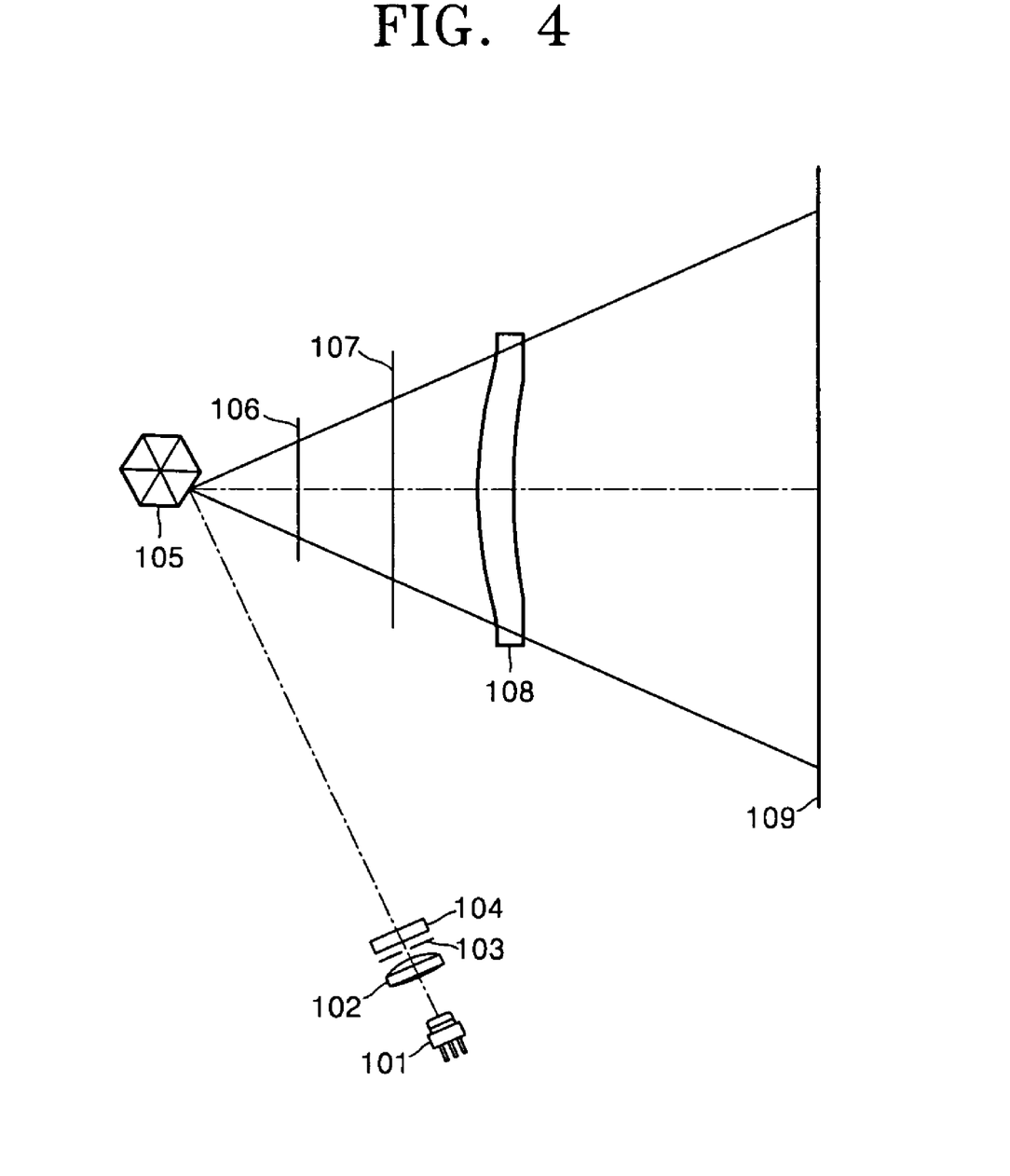
FIG. 4 is a schematic diagram for describing a main scanning direction of the optical scanning apparatus shown in FIGS. 3A and 3B.

FIG. 4 is a schematic diagram illustrating a main scanning direction of the optical scanning apparatus shown in FIGS. 3A and 3B. In FIG. 4, the optical path of only one beam of the two beams emitted from the light source 101 is shown for convenience of explanation, and the reflecting mirrors 106 and 107 are shown at a position on the optical path straightened along the optical axis 100 extended from the light source 101.

In the above optical scanning apparatus, two beams emitted from the light source 101 are obliquely incident on the polygon mirror 105 at a predetermined angle in a sub-scanning direction along the optical axis 100 extended from the center of the light source 101. At this time, the beams are incident on the polygon mirror 105 while being spaced apart from the optical axis 100 extended from the center of the light source 101.

Next, the two beams reflected and deflected by the polygon mirror 105 enter the scanning lenses 108 and 108' after the optical paths of the two beams are bent by the first reflecting mirrors 106 and 106' and the second reflecting mirrors 107 and 107'.

Finally, the two beams having passed the scanning lenses 108 and 108' scan the surfaces of the two photosensitive drums 109 and 109' to be scanned along the optical axes 110 and 110' changed by the first reflecting mirrors 106 and 106' and the second reflecting mirrors 107 and 107', and form spots on the surfaces of the two photosensitive drums 109 and 109', respectively. At this time, the beams incident on the surfaces of the photosensitive drums 109 and 109' form spots on the surfaces while being spaced a predetermined distance from the optical axes 110 and 110' changed by the first reflecting mirrors 106 and 106' and the second reflecting mirror 107 and 107'.

The above-described optical scanning apparatus satisfies $0.2 \leq C1/A1 \leq 3.5$ and $0.2 \leq B1/A1 \leq 3.5$ where A1 is a distance spaced between the optical axis 100 and the beam point on the polygon mirror 105, B1 is a distance spaced between the optical axes 110 and 110' and the respective central axes 108a and 108a' of the scanning lenses, and C1 is a distance spaced between the optical axes 110 and 110' and the beam points on the photosensitive drums 109 and 109'. When the optical scanning apparatus satisfies the above conditions, good bowing characteristics of scan lines can be obtained without adding a correction lens for improving bowing of scan lines.

Figure 5:
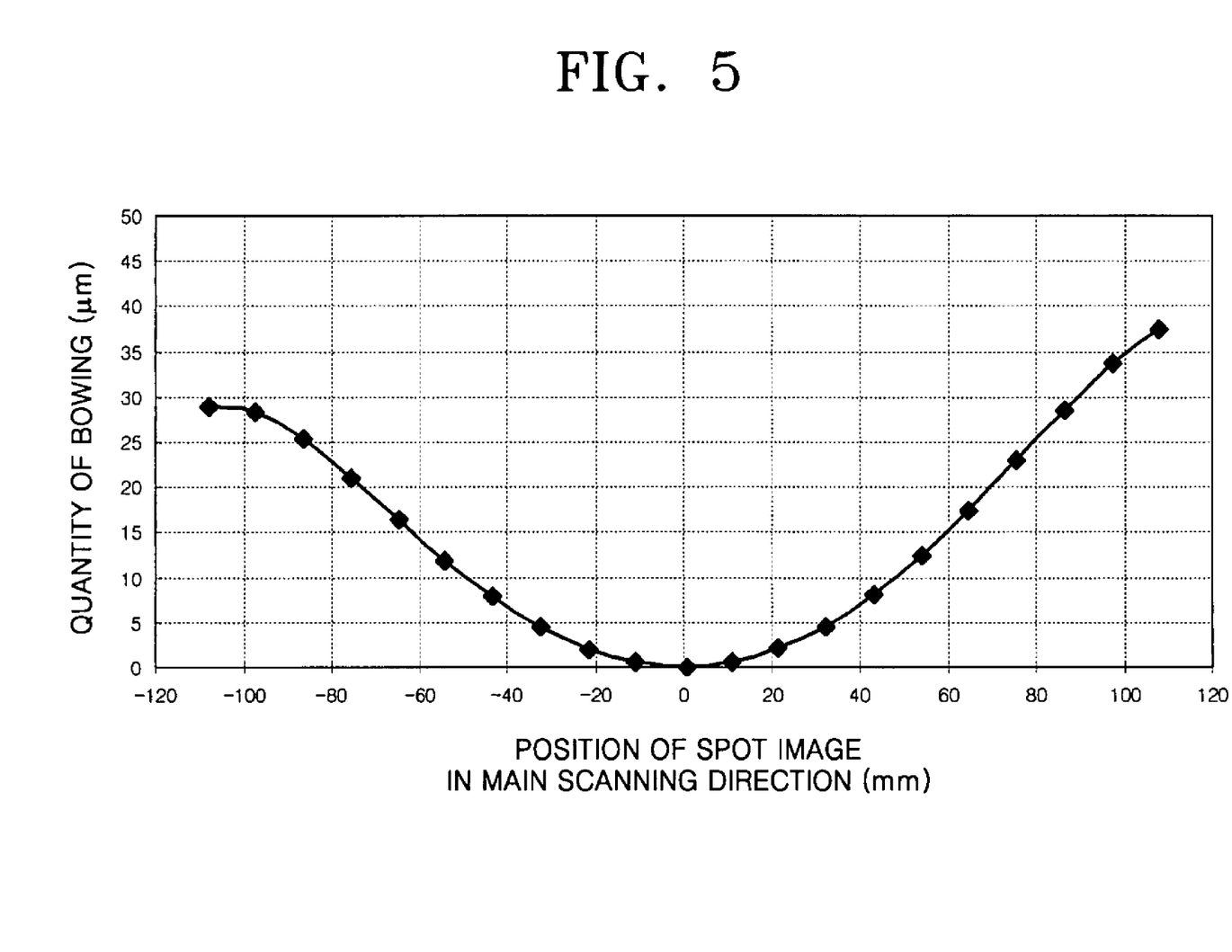
FIG. 5 is a graph showing bowing of scan lines according to a conventional optical scanning apparatus.
Figure 6:
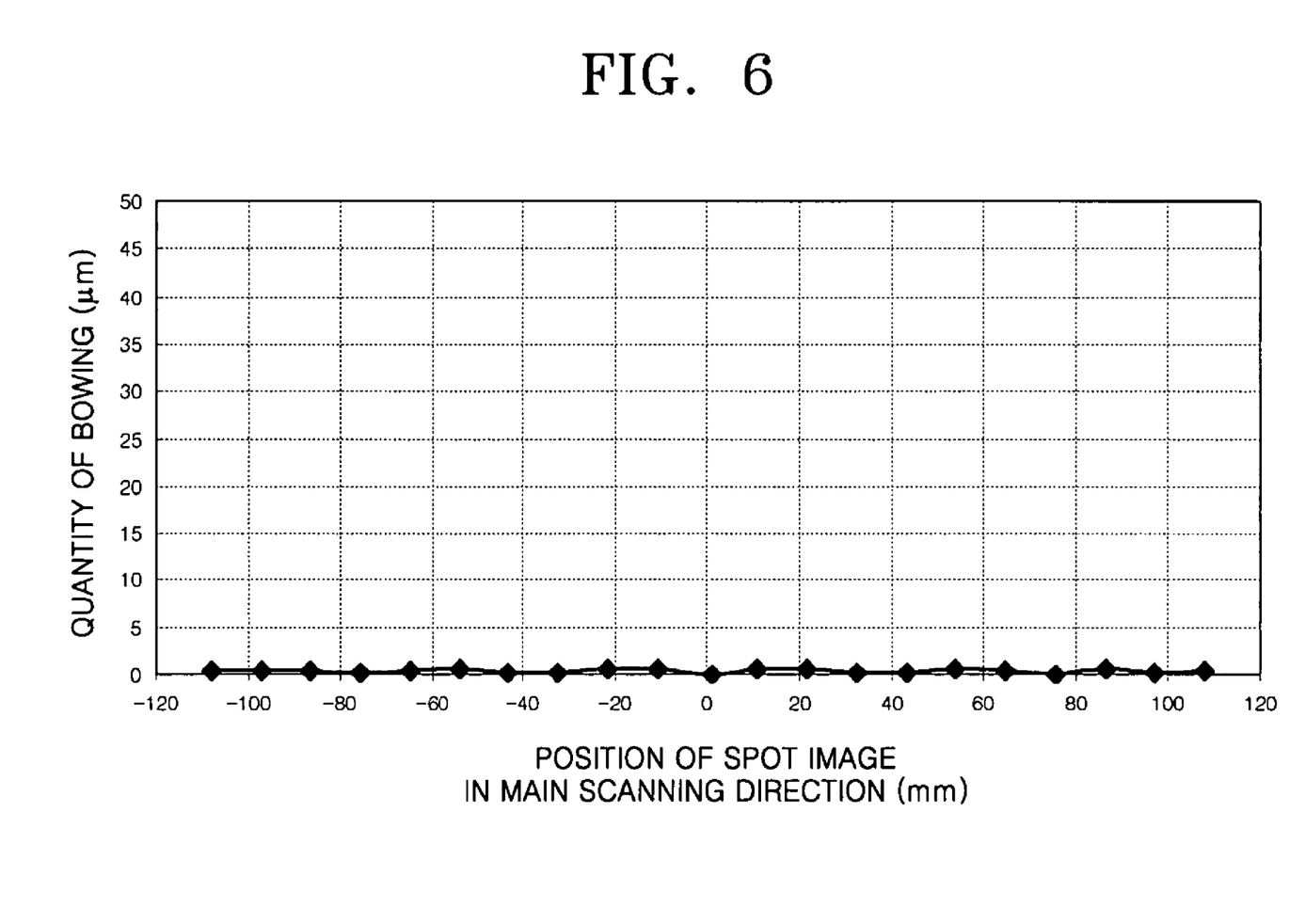
FIG. 6 is a graph showing bowing of scan lines according to an embodiment of the optical scanning apparatus of the present invention.

FIGS. 5 and 6 are graphs showing bowing of scan lines according to a conventional optical scanning apparatus and showing bowing of scan lines according to an embodiment of the optical scanning apparatus of the present invention, respectively. In FIGS. 5 and 6, the horizontal axis represents the position of a spot image in the main scanning direction, and the vertical axis represents the quantity of bowing at the position of the spot image in the main scanning direction.

Referring to FIGS. 5 and 6, when the optical scanning apparatus shown in FIGS. 3A and 3B is employed, it can be seen that bowing of scan lines is significantly reduced compared to a conventional optical scanning apparatus.

In addition, in the optical scanning apparatus, a cover glass (not shown) for protecting the apparatus is installed over the scanning lenses 108 and 108' and the photosensitive drums 109 and 109' to protect parts in the optical scanning apparatus. Here, the cover glass is installed to slant at a predetermined angle to prevent light beams from being reflected from the cover glass, and, bowing of scan lines occurring at this time can be improved by decentering the scanning lenses 108 and 108' by an appropriate value within the range of the above conditions.

As described above, the optical scanning apparatus according to the present invention is a useful apparatus particularly for a tandem optical scanning apparatus which causes a plurality of light beams to simultaneously form spot images on the photosensitive drums by using the light source simultaneously emitting a plurality of light beams. This makes it possible to use a single collimating lens, a single cylindrical lens, and a single polygon mirror. Though this may be beneficial for reducing the manufacturing cost and simplifying the assembly process, such a description is not intended to be limiting as it would be possible to use additional numbers of various components depending on the application.

As described above, bowing of scan lines on a surface to be scanned occurs when a beam of light emitted from the light source is obliquely incident on the polygon mirror at a predetermined angle in a sub-scanning direction can be improved by decentering a scanning lens without adding a correction lens. Therefore, compactness and lightness of the optical scanning apparatus can be achieved by reducing the number of image producing lenses. In addition, the manufacturing cost of the optical scanning apparatus can be reduced by reducing the number of overall parts of the optical scanning apparatus, and simplifying the assembling process thereof.

In addition, since the optical scanning apparatus deflects a plurality of beams simultaneously with one polygon mirror, the polygon mirror can be used commonly. Therefore, the number of parts can be reduced by using parts commonly, and the manufacturing cost of the polygon mirror can be reduced by making the polygon mirror thin.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
a light source;
a plurality of photosensitive drums;

a polygon mirror deflecting a plurality of light beams emitted from the light source; and an image focusing system causing the light beams deflected by the polygon mirror to form spots on surfaces of the plurality of photosensitive drums, wherein the image focusing system is disposed between the polygon mirror and the photosensitive drums, and comprises scanning lenses causing the beams deflected by the polygon mirror to form spots on the respective surfaces of the photosensitive drums, and central axes of the scanning lenses are spaced a predetermined distance from optical axes extended from the center of the light source.

2. The image forming apparatus according to claim 1, wherein the optical scanning apparatus satisfies $0.2 \leq C1/A1 \leq 3.5$ and $0.2 \leq B1/A1 \leq 3.5$ where A1 is a distance spaced between the optical axis and the beam point on the polygon mirror, B1 is a distance spaced between the optical axes and the respective central axes of the scanning lenses, and C1 is a distance spaced between the optical axes and the beam points on the photosensitive drums.

3. The image forming apparatus according to claim 1, wherein the plurality of light beams emitted from the light source are obliquely incident on the polygon mirror at a predetermined angle in a sub-scanning direction.

4. The image forming apparatus according to claim 1, wherein the plurality of light beams emitted from the light source are incident on the polygon mirror.

5. The image forming apparatus according to claim 1, further comprising a collimating lens collimating the beams emitted from the light source, and a cylindrical lens converging the beams having passed through the collimating lens in a sub-scanning direction and causing the beams to be incident on the polygon mirror.

6. The image forming apparatus according to claim 5, wherein the plurality of beams emitted from the light source are incident on the polygon mirror through the collimating lens and the cylindrical lens.

7. The image forming apparatus according to claim 1, further comprising reflecting mirrors installed between the polygon mirror and the scanning lenses to change distances between the plurality of beams deflected by the polygon mirror.

8. The image forming apparatus according to claim 1, wherein the scanning lens is an asymmetrical aspherical plastic lens.

9. An optical scanning system comprising:
a rotatable light deflector;
a light source to emit a plurality of beams of light that scan a plurality of photosensitive medium surfaces to produce images, wherein the plurality of beams of light are incident onto the rotatable light deflector;
a first plurality of mirrors arranged with a second plurality of mirrors to reflect the plurality of beams of light deflected from the rotatable light deflector onto a plurality of optical lenses that guide the plurality of beams of light onto the plurality of photosensitive medium surfaces respectively, wherein a center of the optical lenses is offset from a plurality of axes corresponding to the first and second plurality of mirrors.

10. The system according to claim 9, wherein the plurality of optical lenses are asymmetrical aspherical plastic lenses.

11. The system according to claim 10, wherein equations $0.2 \leq C1/A1 \leq 3.5$ and $0.2 \leq B1/A1 \leq 3.5$ are satisfied, where A1 is a distance measured between a main axis extending from a center of the light source, and a point where the plurality of beams of light are deflected by the rotatable light deflector, B1 is a distance measured between the respective plurality of axes and the center of the plurality of optical lenses, and C1 is a distance measured between the respective plurality of axes and the respective point where the plurality of beams of light are incident upon the plurality of photosensitive medium surfaces.

12. An optical scanning system comprising:
a light source that emits a beam of light;
a light deflector that rotates about a rotational axis and deflects the beam of light at a predetermined angle along a main axis orthogonal to the rotational axis;
a reflector adjustably defining an optical axis; and
an optical lens having a center axis offset a predetermined distance from the optical axis, wherein the reflector receives the beam of light from the light deflector and reflects the beam of light onto the optical lens, and the beam of light is transmitted through the optical lens and is emitted onto a photosensitive surface,
wherein equations $0.2 \leq C1/A1 \leq 3.5$ and $0.2 \leq B1/A1 \leq 3.5$ are satisfied, where A1 is a distance measured between the main axis and a point where the beam of light is deflected by the light deflector, B1 is a distance measured between the optical axis and the center axis, and C1 is a distance measured between the optical axis and the point where the beam of light is emitted onto the photosensitive surface.

13. The system of claim 12, wherein the reflector comprises:
a first mirror; and
a second mirror, wherein the first mirror is disposed to receive the beam of light from the light deflector and reflect the beam of light to the second mirror, disposed to receive the beam of light from the first mirror and reflect the beam of light onto the optical lens.

14. The system of claim 12, further comprising
a collimating lens; and
a cylindrical lens, wherein the collimating lens and the cylindrical lens guide the beam of light onto the light deflector at a predetermined angle of incidence in a sub-scanning direction.

15. The system of claim 14, wherein the system comprises one collimating lens, one cylindrical lens and one light deflector.

* * * * *